United States Patent [19]
Riviere

[11] Patent Number: 5,416,858
[45] Date of Patent: May 16, 1995

[54] INTEGRATED ELECTROOPTICAL MODULATION DEVICE

[75] Inventor: Luc Riviere, Sophia Antipolis, France

[73] Assignee: Thomson-CSF, Paris, France

[21] Appl. No.: 167,840

[22] PCT Filed: Jun. 19, 1992

[86] PCT No.: PCT/FR92/00564
§ 371 Date: Dec. 27, 1993
§ 102(e) Date: Dec. 27, 1993

[87] PCT Pub. No.: WO/9300755
PCT Pub. Date: Jan. 7, 1993

[30] Foreign Application Priority Data

Jun. 27, 1991 [FR] France .............................. 91 08014

[51] Int. Cl.⁶ .................................................. G02B 6/10
[52] U.S. Cl. .................................... 385/1; 385/2; 385/9; 359/254
[58] Field of Search .................. 385/1, 2, 3, 4, 8, 9, 385/16; 359/237, 238, 245, 254

[56] References Cited

U.S. PATENT DOCUMENTS

| | | | |
|---|---|---|---|
| 4,679,893 | 7/1987 | Ramer | 385/9 |
| 4,900,115 | 2/1990 | Heuring et al. | 385/16 X |
| 5,101,450 | 3/1992 | Olshansky | 385/3 |
| 5,161,206 | 11/1992 | Djupsjobacka | 385/2 |
| 5,168,534 | 12/1992 | McBrien et al. | 385/3 |
| 5,278,923 | 1/1994 | Nazarathy et al. | 385/3 |

OTHER PUBLICATIONS

IEEE Photonics Technology Letters, Feb. 1991, "In Search of a Linear Electrooptic Amplitude Modulator", Liu et al., vol. 3 pp. 144–146.

Primary Examiner—Rodney B. Bovernick
Assistant Examiner—Hemang Sanghavi
Attorney, Agent, or Firm—Oblon, Spivak, McClelland, Maier, & Neustadt

[57] ABSTRACT

An electrooptical modulation device formed on an electrooptical substrate, including a first region having a Y-junction for receiving an optical signal to be modulated and dividing the optical signal into two equal optical signals, a first modulation region of length $L_1$ having two parallel optical waveguides spaced sufficiently apart to prevent optical coupling, a second section of length $L_2$ over which the optical waveguides extend and define a coupling length $l_{c2}$, this second section not being subjected to electrooptical modulation, a second modulation region of length $L_3$ having two parallel optical waveguides, a third section of length $L_4$ over which the optical waveguides extend and define a coupling length $l_{c4}$, and a fourth section for separating the optical waveguides and delivering two modulated optical signals of different intensity. This device operates with reduced control voltages and makes it possible to enhance the linearity of the electrooptical response.

10 Claims, 5 Drawing Sheets

INTEGRATED ELECTROOPTICAL MODULATION DEVICE

BACKGROUND OF THE INVENTION

The present invention relates to devices which allow an optical signal to be modulated on the basis of an electrical signal. Such devices are most often integrated on the surface of a substrate consisting of a material whose optical properties change under the influence of an electric field which is applied to it. These devices make it possible in particular to modulate a light signal in order to make it possible to transmit analogue signals, for example vestigial side band amplitude-modulated (VSBAM) television signals over cabled television networks employing optical fibres. In order to enhance the linearization of the electrooptical response of an integrated optical modulator, the applicant has filed a French Patent Application under No. 2 670 589. This invention is based on the simultaneous modulation of two distinct regions of a Y-junction coupler. The modulation of a "coupler"-type region has the drawback of not being very effective, since it necessitates a two-conductor electrode structure and thus a vertical electric field (on Z-cut LiNbO$_3$).

SUMMARY OF THE INVENTION

Similar structures are also known from two articles, one which appeared in IEEE Photonics Technology Letters, vol. 3, February 1991, New York U.S.A., pages 144 to 146, and the other which appeared in NTZ Nachrichttechnishe Zeitschrift, vol. 42, No. 2, February 1989, Berlin, Germany, pages 68 to 71. These structures exhibit the same drawbacks.

The object of the present invention is to further enhance the linearization of the electrooptical response of an integrated optical modulator, and also to reduce the control voltage necessary for the modulation. To this end, the present invention is based on the simultaneous modulation of two different regions of an interferometer, that is to say of two regions in which the guides are sufficiently far apart. This allows the use of a three-electrode structure, more effective from an electronic point of view, and thus a reduced control voltage. This structure is compatible with a X-cut on lithium niobate LiNbO$_3$, and moreover gives several advantages inherent in this cut, and especially less sensitivity to temperature and the possibility of integration of a polarizer allowing monomode, monopolarization operation.

The invention more particularly relates to an electrooptical modulation device of the type comprising, on an electrooptical substrate:

a first section 1 comprising a Y-junction, intended to receive the optical signal to be modulated and to divide it into two equal parts, a first modulation region 2 of length L$_1$ comprising two parallel optical guides 104, 105 for receiving the two parts of the optical signal coming out of the first section, the said guides 104, 105 being spaced sufficiently to prevent optical coupling between them, the said region also comprising three electrodes 106, 107, 108 extending over the substrate along the guides in order to apply a modulation electric field as a function of a modulation electrical signal of amplitude V$_1$ applied to the said electrodes 106, 107, 108, a third, coupler-forming section 3 in which the optical guides 110, 111 extend, while remaining mutually parallel over a length L$_2$, and determining a coupling length l$_{c2}$, with $$Y = \frac{L_2}{l_{c2}},$$

a section 6 for separating the optical guides 115, 116 and delivering two optical signals P$_R$, P$_S$ modulated in a complementary way; this device being characterized in that the third section is not subjected to modulation, and in that it further comprises:

a second modulation region 4 of length L$_3$ comprising two parallel optical guides 112, 113 for receiving the two parts of the optical signal coming out of the third section 3, the said guides 112, 113 being spaced apart sufficiently to prevent optical coupling between them, the said region also comprising three electrodes 106', 107', 108' extending over the substrate along the guides for applying a modulation electric field as a function of a modulation electrical signal of amplitude V$_2$ applied to the said electrodes, and a fifth, coupler-forming section 5 in which the optical guides extend, while remaining mutually parallel and coupled over a length L$_4$, and determining a coupling length l$_{c4}$, and with $$Y' = \frac{L_4}{l_{c4}},$$

this fifth section 5 not being subjected to modulation.

Other features and advantages of the invention will appear more fully in the description which follows, making reference by way of non-limiting example to a plan-type diagram of a modulator according to the invention.

DESCRIPTION OF THE PREFERRED EMBODIMENTS

Figure 1:
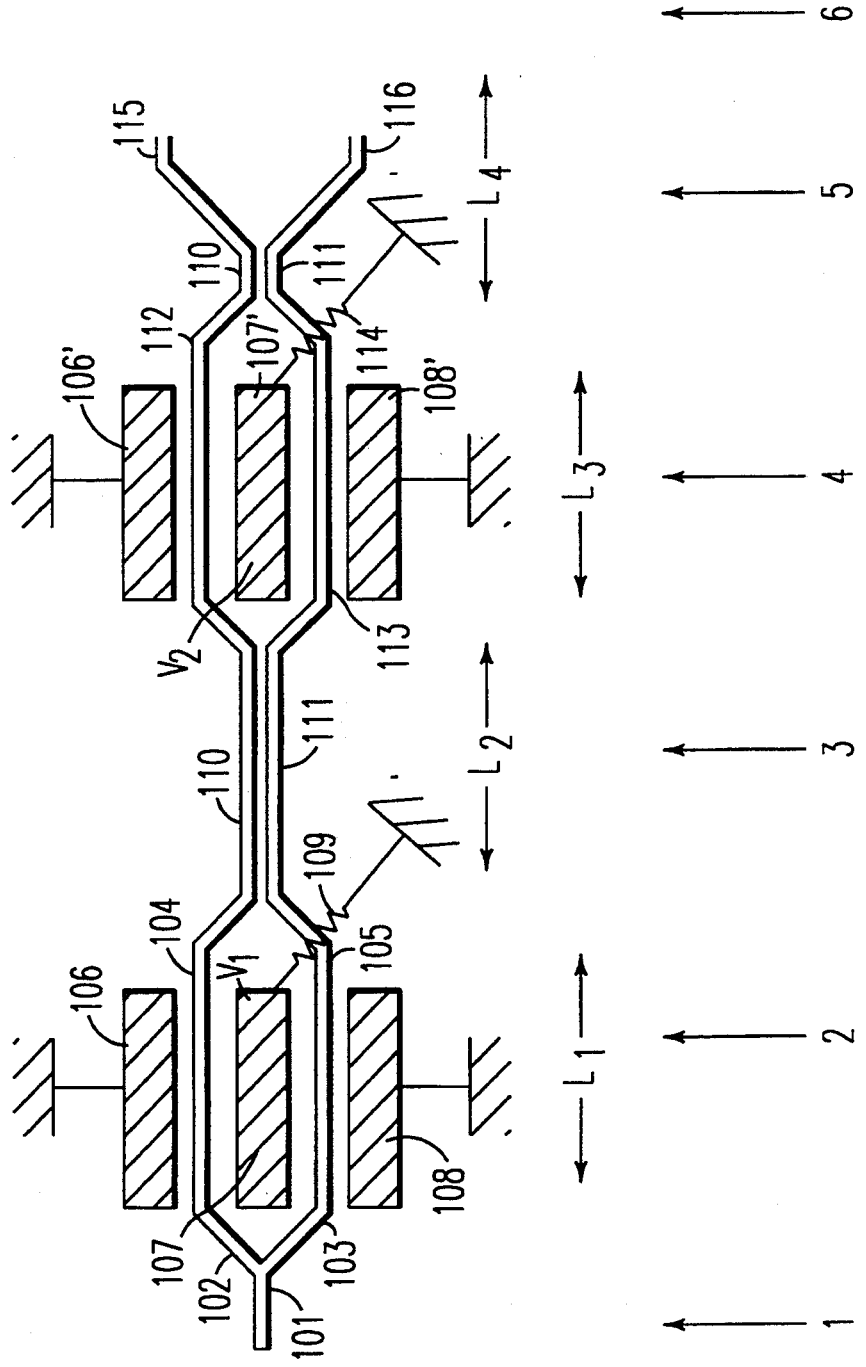
FIG. 1 represents a diagrammatic view of a first embodiment.

In the illustrative embodiment represented in FIG. 1, the coupler according to the invention is formed by six sections 1 to 6.

The first section 1 comprises a Y-type junction of known type, in which the light signal arriving via an input guide 101 is divided into two substantially equal parts by two arms 102 and 103 which separate from the guide 101.

The second section (2), of length L$_1$, comprises two guides (104, 105) extending mutually parallel, spaced apart sufficiently to avoid optical coupling by means of the evanescent wave. This second section (2) further comprises a three-electrode structure (106, 107, 108) for the electrooptical modulation of the two guides (104, 105) as a function of an electrical signal $V_1$ applied to the said structure. The outer electrodes (106 and 108) are linked to earth, whereas the central electrode (107) is linked, on one side, to a modulation source which applies an electrical signal $V_1$ to it and, on the other side, to earth via a resistor (109), itself linked to earth. Polarization with the central electrode has the advantage of necessitating a lower switching voltage than that necessary for the two-electrode solutions which use the vertical component of the electric field, less effective than the horizontal component used here.

The representation of the electrode feed system is illustrated diagrammatically in FIG. 1.

The guides (104, 105) then extend across the section (3) over a length $L_2$. The guides (110 and 111) are spaced apart by a distance $G_1$ which is sufficiently small to allow coupling between the said guides by means of the evanescent is wave. This region characterized by a parameter $$Y = \frac{L_2}{l_{c2}}$$

in which:

$L_2$ is the physical length of the coupler and, $l_{c2}$ is the length of the coupling, that is to say the length for which all the light is transferred from one guide to the other. The coupling length is fixed by construction, by the spacing between the two optical guides. The Y parameter is therefore fixed by construction, but can also be adjusted according to one variant, described later. This coupling region (3) is not subjected to modulation.

The waveguides (110, 111) then separate again within section (4) and exhibit two branches (112, 113) which are sufficiently far apart to avoid any optical coupling. A three-electrode structure (106', 107', 108') allows modulation as a function of an electrical signal of amplitude $V_2$ applied to one side of the central electrode (107') the other end of which is linked to earth via a resistor (114). The operation of this section (4) is similar to that of section (2).

The fifth region (5) consists of a coupler similar to that constituting the third section (3) and with a characteristic $$Y' = \frac{L_4}{l_{c4}}$$

in which:

$L_4$ is the physical length of the coupler and, $l_{c4}$ is the length of the coupling of this coupler.

The Y' parameter is fixed, like the Y parameter, by construction or by electrical adjustment.

Next, in section (6), the two guides separate so that the interaction between them ceases. They then arrive at outlet guides (115, 116) which deliver the modulated optical signals $P_R$ and $P_S$ respectively.

Let:

$$\alpha = \frac{V_2 L_2}{V_1 L_1},$$

$\alpha$ designating the coefficient of proportionality between the voltages applied to the two modulation regions, weighted by the ratio of the lengths, and $$\beta = \frac{Y'}{Y} = \frac{L_4}{L_2} \times \frac{l_{c2}}{l_{c4}},$$

$\beta$ being the coefficient of proportionality of the coupling between the two coupling regions, fixed a priori by construction, but possibly electrically adjustable.

It is noted that, for an appropriate choice of the values of $\alpha$, $\beta$, Y, a linearized electrooptical response is obtained, in the sense that all the even-order distortions are zero because the device is self-biased, and the third order distortion is also cancelled.

The cancellation of the third-order distortions is obtained when:

$$\tan(\pi \beta Y) = - \frac{\sin(\pi Y)}{(3\alpha^2 + 1)\cos(\pi Y) + \alpha(\alpha^2 + 3)}$$

In order to modulate 100% of the optical power, another relationship between the parameters $\alpha$, $\beta$ and Y has to be satisfied, a relationship which has not been determined analytically, but which has been obtained numerically: the solutions may be classified into two groups:

Solutions of the "alternate" type in which the two modulation sections (2, 4) are subjected to modulation signals $V_1$, $V_2$ of opposite signs. In this case, $\alpha$ is negative. They therefore require a prior inversion of the modulation signal, which can be brought about, for example, by an electronic invertor placed in front of one of the two modulation regions.

These solutions of alternate type are obtained when:

$$n \leq Y \leq n+0.5 \text{ with n integer} \geq 0$$

Solutions of "uniform" type, in which the two sections are subjected to a modulation signal of the same sign are obtained when:

$$n+0.5 \leq Y \leq n+1 \text{ with n integer} \geq 0$$

In what follows, only solutions of the "uniform" type will be described, the solutions of the "alternate" type being able to be described from the relationships:

$Y_a = 1 - Y_u$ $Y'_a = 1 - Y'_u$, that is to say $\beta_a Y_a = 1 - \beta_u Y_u$ $\alpha_a = -\alpha_u$ in which $Y_u$, $Y'_u$ and $\beta_u$, $\alpha_u$ describe the uniform solutions developed and $Y_a$, $Y'_a$ and $\beta_a$, $\alpha_a$ are the parameters of the associated alternate solution.

Figure 2:
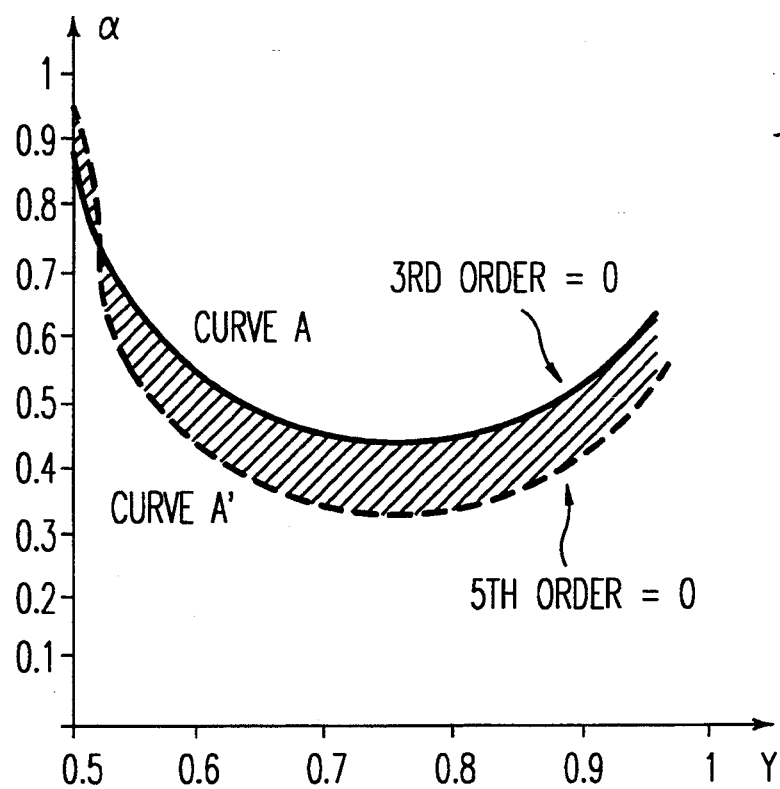
FIG. 2 represents the curve of the $\alpha$ values as a function of the Y parameter.
Figure 3:
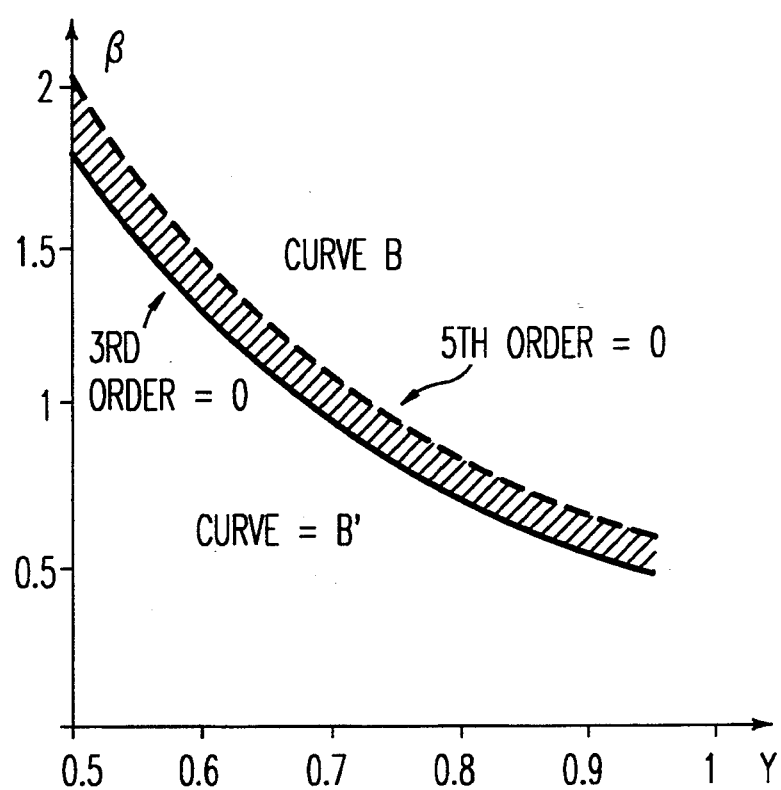
FIG. 3 represents the curve of the $\beta$ values as a function of the Y parameter.

FIGS. 2 and 3 represent the value of the parameters $\alpha$ and $\beta$ respectively as a function of the Y parameter for defining a set of linearized solutions. The values of the curves A and A' corresponding to the $\alpha$ parameter make it possible simultaneously to bring about the cancellation of the third-order (curve A) and fifth order (curve A') distortions respectively, and a modulation ratio of 100% of the optical power.

The values of $\beta$ indicated in FIG. 3 in curve B and B' correspond to the basic values for satisfying these conditions, and especially the cancellation of the third-order (curve B) and fifth-order (curve B') distortions respectively. A series of values of $\beta$ exist also satisfying these conditions, deduced from the solution described by the relationship:

$$\beta_i = \frac{n}{Y} + \beta$$

with n integer $\geq 0$ in which:

$\beta_i$ designates the other possible values obtained on the basis of the value $\beta$ $\beta$ designates the values determined graphically in FIG. 3.

The choice of a particular solution for this set may be made with regard to an additional criterion such as the reduction in the control power, the lower sensitivity of the device to temperature or a sizeable tolerance in the manufacturing parameters.

The curves A' and B' represent the best choices of $\alpha$, $\beta$, which cancel out the fifth order while preserving a modulation depth of the order of 100%. Depending on the applications envisaged, the best choice of $\alpha$ and $\beta$ parameters will lie between the two limits cancelling the third order and the fifth order. This defines a range of possible choice represented by the hatched regions lying between the two curves A and A' and B and B' respectively.

Figure 4:
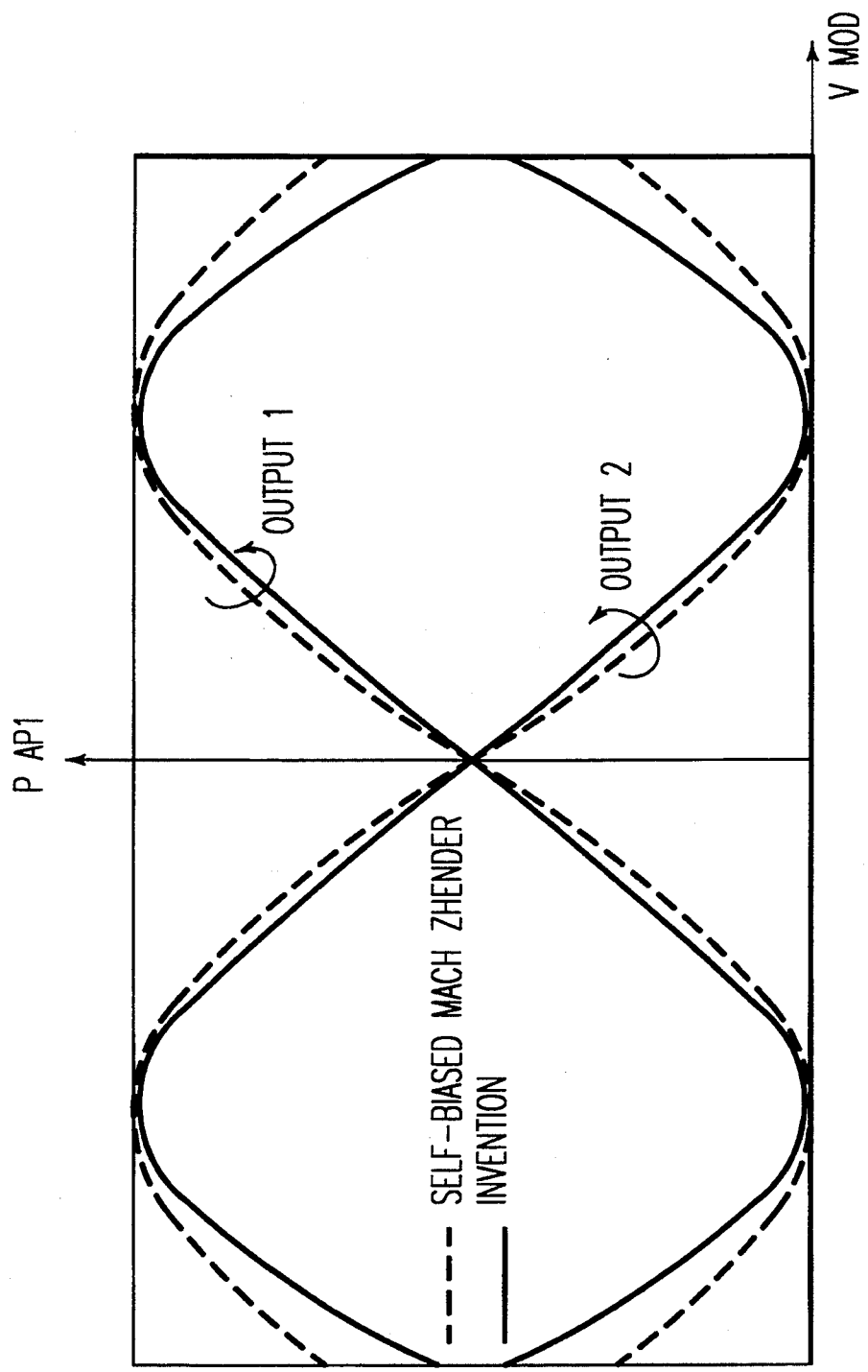
FIG. 4 represents the response curves of the modulator according to the invention.

FIG. 4 represents the electrooptical response, that is to say the optical power delivered at the outputs ($P_R$) and ($P_S$) as a function of the control voltage V applied to the electrodes, compared with the electrooptical response of a self-biased Mach Zhender-type device. A substantial improvement in the linearity of the response is noted. FIG. 4 was plotted for the particular case in which:

$Y = 0.6$ $\alpha = 0.53$ $\beta = 1.3044$

The Y parameter is fixed by the ratio $$\frac{L_2}{l_{c2}}$$

of the third region, that is to say by the length of this region and the spacing between the two guides. The parameter $Y' = \beta Y$ can be obtained by construction i.e.:

by using the same spacing $G_2$ between the guides of the second modulation region (5) as the spacing $G_1$ provided between the guides (110, 111) of the first coupling section (3). In this case, $l_{c4} = l_{c2}$ and the choice of a $\beta$ value is given by the choice of a length $L_4 = \beta L_2$, if the spacing $G_1$ is different from the spacing $G_2$, it is possible to fix the $\beta$ parameter independently of the length $L_4$.

It is also possible to adjust the Y and $Y' = \beta Y$ parameters electrically, so as to correct the operating point fixed by construction. This makes it possible to increase the manufacturing tolerances and to correct for possible fluctuations in these parameters. This correction may be performed by applying a DC adjustment voltage, either on section (3) so as to adjust the value of Y, or on the section (5), so as to adjust the Y' parameter, or on both sections, so as to adjust the values of Y and of Y' independently. The adjustment can be done by using three types of electrode structure, represented respectively by FIGS. 5 to 7.

Figures 5, 6, 7, 8:
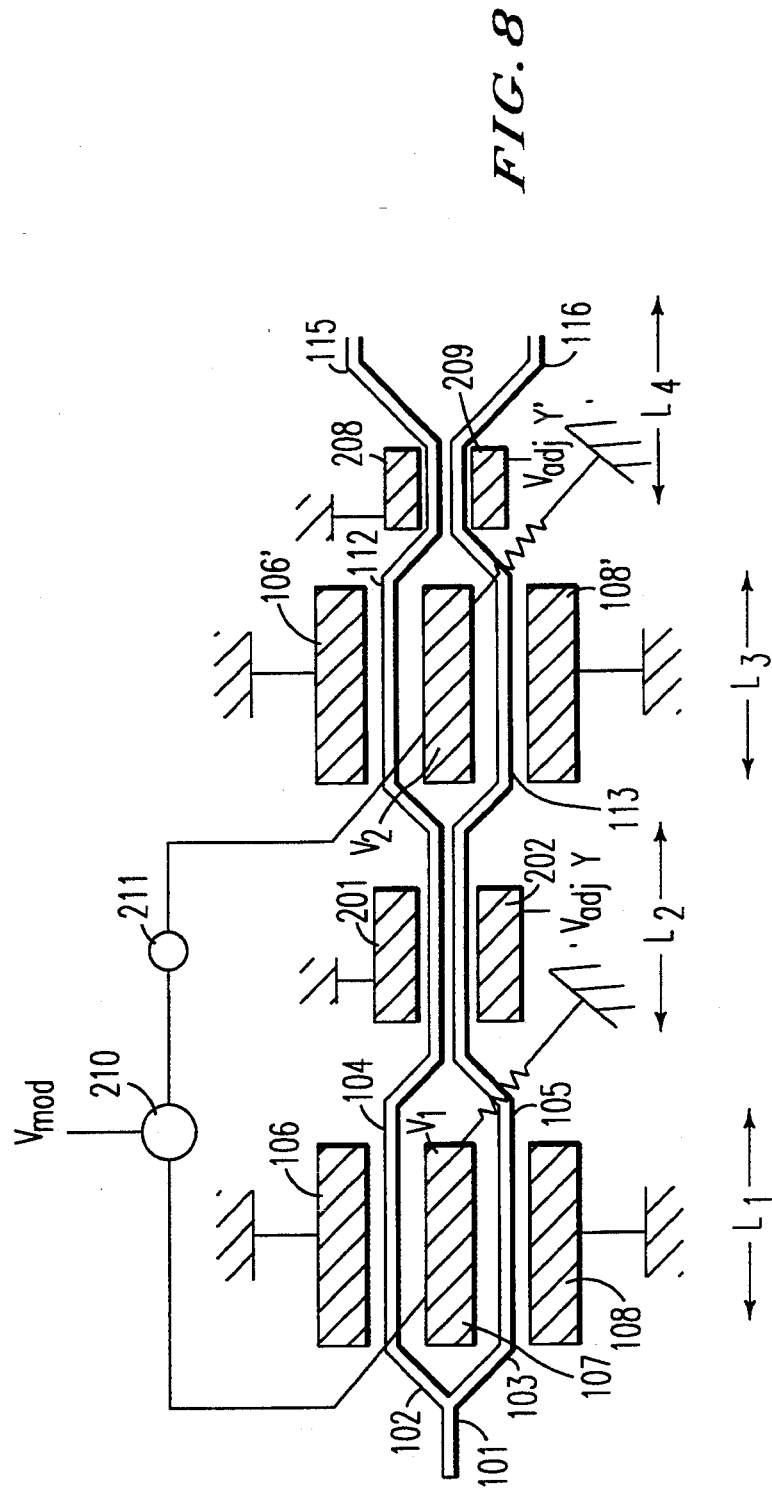
FIGS. 5 to 7 represent cross-sectional views of embodiments of the coupling section of the modulator according to the invention.
FIGS. 8 to 10 represent plan-type diagrams of variants of modulators according to the invention.

FIG. 5 describes a structure with two electrodes placed symmetrically with respect to the guides (110, 111). The electrodes (201, 202) allow a DC voltage $V_{DC}$ to be applied.

FIG. 6 describes a three-electrode structure, the two outer electrodes (203, 204) being linked to earth and the central electrode (205) being linked to a voltage source $V_{DC}$. The central electrode (205) is sited between the two guides (110, 111).

A third possible structure is represented in FIG. 7; it includes two offset electrodes (206, 207), one of the waveguides (110) being placed between the two electrodes (206 and 207). One of the electrodes (206) is linked to a voltage source $V_{DC}$ while the other electrode (207) is linked to earth.

These latter two solutions act on the difference in synchronism of the coupler. The latter two solutions represented in FIGS. 6 and 7 are the most effective from the electrooptical point of view. However, they have the drawback of de-biasing the interferometric region which precedes the coupler (modulation region (2) for the couplers of section (3), modulation region (4) for the coupler in coupling region (5)). This lack of bias causes even-order distortions to appear, except when they are compensated for in the interferometric region, either by superimposition of a DC level on the modulation signal, with the aid of a biasing T, or by the use of compensation electrodes in the interferometric region.

The $\alpha$ parameter may be fixed, either by construction or by adjustment within a control circuit external to the component.

In order to fix the $\alpha$ parameter by construction, it is sufficient to choose a length $L_3 = \alpha L_1$. In this way, the two interferometric regions, the region (2) and the region (4), can be subjected to modulation signals of the same amplitude and either of identical signs for the "uniform" solution, or of opposite signs for the "alternate" solution.

FIG. 8 represents an illustrative embodiment making use of two electrodes (201, 202) and (208, 209) for adjusting the Y and Y' parameters respectively by DC voltages $V_{adj}Y$ and $V_{adj}Y'$. A single modulation source $V_{mod}$ feeds the two modulation regions (2) and (4) via an RF divider (210) or a 3 dB coupler dividing the modulation signal into two signals of the same amplitude.

An attenuator (211) placed on one of the two outputs of the divider (210) makes it possible to adjust the relative amplitude of the signals feeding the electrodes of each of the modulation regions (2), (4).

The use of an attenuator (211) to adjust the relative amplitude of the modulation signals makes it possible freely to determine the lengths $L_1$ and $L_3$ of the modulation regions (2) and (4) respectively, and to optimise these lengths for other parameters, for example in order to enhance the pass band.

Needless to say, any other electronic solution making it possible to adjust the amplitude of the signals of the two arms can be envisaged, for example the use of two amplifiers with different gains.

Figure 9:
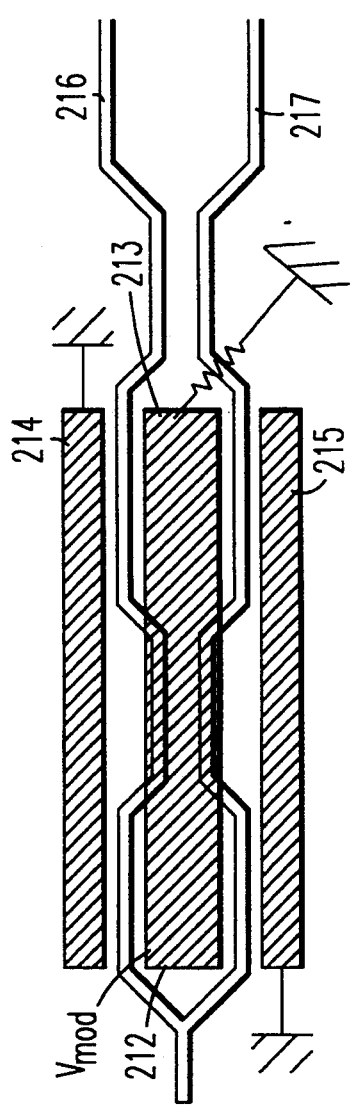

According to another embodiment represented in FIG. 9, a single electrode (212) is used to modulate the two modulation regions (2, 4). The use of a splitter is thus avoided. The central electrode (212) is linked, on the one hand, to a modulation voltage generator delivering a signal $V_{mod}$ and, on the other hand, to earth by way of a resistor (213). The two lateral electrodes (214, 215) are linked to earth. The overlap of the adjacent parts of the optical guides (216, 217) is of no consequence, since an isolating layer separates the said optical guides and the electrode (212). This relates to an example in which the α parameter is fixed by construction, by the difference in the lengths of the interferometric regions.

Figure 10:
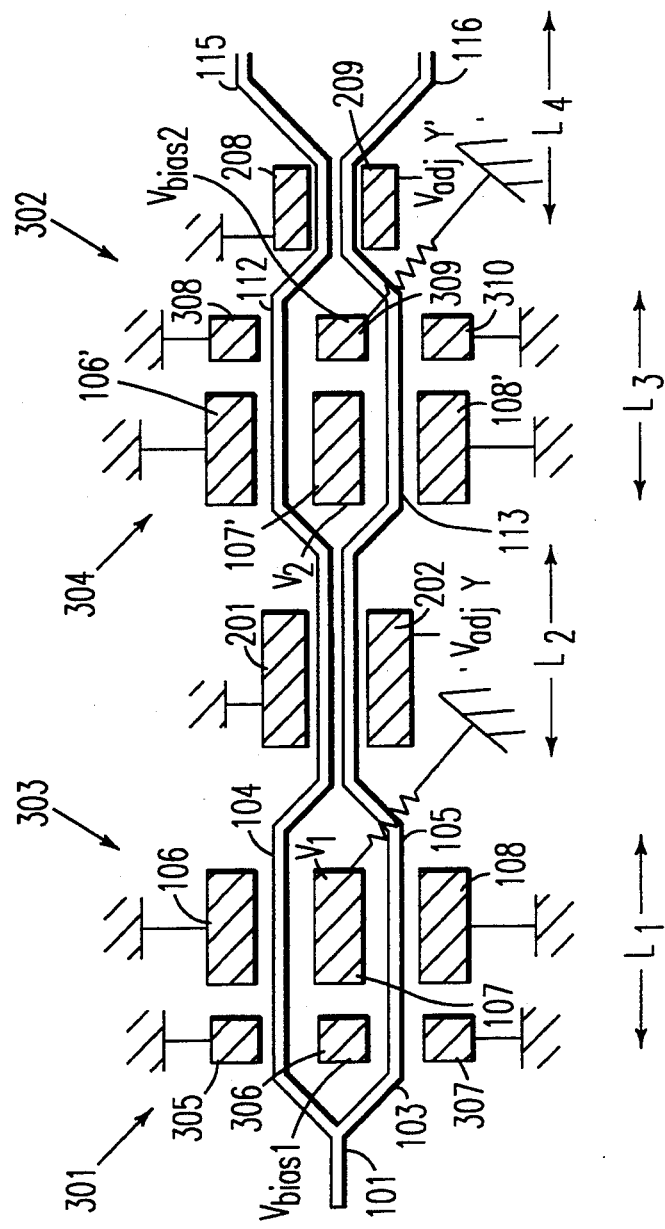

The circuit according to the invention is self-biased by nature. When the modulation signal is zero, half the power is available in each of the two outputs, and when the sign of the modulation is changed, the role of the two outputs is reversed. The component may, however, either in the event of a manufacturing defect, or on the use of electrodes with three conductors, or with two off-centred conductors for adjusting one or other of the couplers, lose this property as a result. That being so, some even-order distortions are no longer cancelled out and the linearity of the device is degraded. In order to compensate for this defect of these embodiments, a first solution consists in superimposing a DC voltage on the modulation signal of the de-biased region, by means of an electrical solution, for example with the aid of a polarization T. Another solution represented in FIG. 10 consists in adding a series of additional electrodes for de-biasing. In the example represented in FIG. 10, these two series of electrodes (301, 302) each consist of three electrodes (305, 306, 307) and (308, 309, 310) respectively. The outer electrodes (305 and 307) and (308 and 310) respectively are linked to earth, while the two central electrodes (306, 309) are linked to an electrical source delivering the $V_{bias1}$ and $V_{bias2}$ voltages respectively. The electrode structures (301) and (302) have been represented respectively before and after the modulation electrode structures (303) (106, 107, 108) and (304) (106', 107', 108') with which they are associated in the modulation regions. In practice, these de-biasing electrode structures can be placed equally well before or after the modulation region.

The embodiments described in the foregoing are not exhaustive. The invention may be the subject of numerous variants depending on technological constraints and choices.

I claim:

1. An electrooptical modulation device formed on an electrooptical substrate, said electrooptical modulation device comprising:
   a first region having a Y-junction for receiving an optical signal to be modulated and dividing said optical signal into two equal optical signals;
   a first modulation region of a length $L_1$, said first modulation region having a first pair of optical waveguides for receiving said two equal optical signals, said first pair of optical waveguides consisting of two optical waveguides being parallel to one another and spaced sufficiently apart so as to prevent optical coupling therebetween, and said first modulation region further having a plurality of first modulation electrodes, positioned along said first pair of optical waveguides, for receiving a modulation electrical signal of amplitude $V_1$ and generating a modulation electric field as a function of said modulation electrical signal;
   a first coupler-forming region of a length $L_2$ over which a second pair of parallel optical waveguides extend and define a coupling length $l_{c2}$, said second pair of parallel optical waveguides receiving two modulated optical signals output from said first pair of optical waveguides, wherein a Y-parameter is defined as $Y = L_2/l_{c2}$, and wherein said first coupler-forming region is not subject to electrooptical modulation;
   a second modulation region of a length $L_3$, said second modulation region having a third pair of optical waveguides for receiving said two modulated optical signals output from said second pair of parallel optical waveguides of said first coupler-forming region, said third pair of optical waveguides consisting of two optical waveguides being parallel to one another and spaced sufficiently apart so as to prevent optical coupling therebetween, and said second modulation region further having a plurality of second modulation electrodes, positioned along said third pair of optical waveguides, for receiving a modulation electrical signal of amplitude $V_2$ and generating a modulation electric field as a function of said modulation electric signal;
   a second coupler-forming region of a length $L_4$ over which a fourth pair of parallel optical waveguides extend and define a coupling length $l_{c4}$, said fourth pair of parallel optical waveguides receiving two modulated optical signals output from said third pair of optical waveguides, wherein a Y'-parameter is defined as $Y' = L_4/l_{c4}$, and wherein said second coupler-forming region is not subject to electrooptical modulation; and
   a second region for separating said second pair of parallel optical waveguides and delivering two optical signals modulated in a complementary manner.

2. An electrooptical modulation device according to claim 1, wherein a spacing between said second pair of parallel optical waveguides in said first coupler-forming region is equal to a spacing between said third pair of optical waveguides in said second modulation region.

3. An electrooptical modulation device according to claim 1, wherein at least one of said first and second coupler-forming regions comprises a plurality of electrodes connected to a DC voltage source, for adjusting said Y and Y' parameters.

4. An electrooptical modulation device according to claim 3, wherein said electrical modulation signals of amplitudes $V_1$ and $V_2$ are of opposite polarities.

5. An electrooptical modulation device according to claim 1, wherein at least one of said first and second modulation regions comprises a plurality of de-biasing electrodes connected to a DC voltage source.

6. An electrooptical modulation device according to any of claims 1-5, wherein a coefficient of proportionality between said electrical modulation signals $\alpha = V_2L_3/V_1L_1$ is selected as a function of said Y-parameter in a range fixed by two limits at which third and fifth order distortions respectively are cancelled.

7. An electrooptical modulation device according to any of claims 1-5, wherein a coefficient of proportionality of coupling between said first and second coupler-forming regions $\beta = Y'/Y = L_4l_{c2}/L_2l_{c4}$ is selected as a function of said Y-parameter in a range fixed by two limits for which third and fifth order distortions respectively are cancelled.

8. An electrooptical modulation device according to any of claims 1-5, wherein said electrical modulation signals are output by a single source and are applied to said electrodes of each of said first and second modulation regions via a divider.

9. An electrooptical modulation device according to claim 8, wherein means for adjusting a relative amplitude between said electrical modulation signals is provided between outputs of said divider and said first and second modulation electrodes.

10. An electrooptical modulation device according to claim 1, further comprising a series of three electrodes extending over both of said first and second modulation regions, a central one of said three electrodes being separated from said second pair of parallel optical waveguides of said first coupler-forming section which separates said first and second modulation regions by an isolating layer.

* * * * *